(12) United States Patent
Young

(10) Patent No.: US 10,599,401 B2
(45) Date of Patent: Mar. 24, 2020

(54) COMPONENT-BASED SOFTWARE SYSTEM AND DEVELOPMENT METHOD

(71) Applicant: Yi Young, Flushing, NY (US)

(72) Inventor: Yi Young, Flushing, NY (US)

( * ) Notice: Subject to any disclaimer, the term of this patent is extended or adjusted under 35 U.S.C. 154(b) by 0 days.

(21) Appl. No.: 15/871,254

(22) Filed: Jan. 15, 2018

(65) Prior Publication Data

US 2018/0150284 A1 May 31, 2018

Related U.S. Application Data

(63) Continuation-in-part of application No. PCT/US2016/042402, filed on Jul. 15, 2016.

(60) Provisional application No. 62/193,151, filed on Jul. 16, 2015.

(51) Int. Cl.
*G06F 8/30* (2018.01)
*G06F 8/36* (2018.01)
*G06F 8/41* (2018.01)

(52) U.S. Cl.
CPC .............. *G06F 8/31* (2013.01); *G06F 8/36* (2013.01); *G06F 8/433* (2013.01)

(58) Field of Classification Search
None
See application file for complete search history.

(56) References Cited

U.S. PATENT DOCUMENTS

| 5,471,596 | A  | * | 11/1995 | Brown, III | G06F 8/24 |
| 7,353,501 | B2 | * | 4/2008  | Tang       | G06F 11/3624 |
|           |    |   |         |            | 712/224 |
| 7,614,036 | B2 | * | 11/2009 | Bjornson   | G06F 8/34 |
|           |    |   |         |            | 717/105 |
| 7,865,881 | B2 | * | 1/2011  | Wilkinson  | G06F 8/433 |
|           |    |   |         |            | 717/124 |
| 8,145,593 | B2 | * | 3/2012  | Nayak      | G06Q 10/10 |
|           |    |   |         |            | 707/607 |
| 8,667,389 | B2 | * | 3/2014  | Black      | G06F 16/88 |
|           |    |   |         |            | 715/235 |
| 8,850,199 | B2 | * | 9/2014  | Zaverucha  | H04L 9/3252 |
|           |    |   |         |            | 713/168 |
| 2006/0020689 | A1 | * | 1/2006 | Roman     | G06F 8/00 |
|           |    |   |         |            | 709/220 |
| 2012/0047494 | A1 | * | 2/2012 | Unrein    | G06F 9/44521 |
|           |    |   |         |            | 717/137 |

(Continued)

FOREIGN PATENT DOCUMENTS

WO          2017011718          1/2017

OTHER PUBLICATIONS

Droppo, "Methods to Register Models and Input/Output Parameters for Integrated Modeling", 2010, International Environmental Modelling and Software Society (iEMSs) (Year: 2010).*

(Continued)

*Primary Examiner* — Hossain M Morshed
(74) *Attorney, Agent, or Firm* — F. Chau & Associates, LLC

(57) ABSTRACT

A method of assembling software includes: enabling a user to code a Computation Function (CF) (S101); determining whether the user is done coding the CFs (S102); enabling a user to code a Part Function (PF) using one or more of the available CFs (S103); determining when the user is done creating all the PFs (S104); and enabling a user to create software using one or more of the available PFs.

18 Claims, 10 Drawing Sheets

(56) References Cited

U.S. PATENT DOCUMENTS

| | | | | |
|---|---|---|---|---|
| 2012/0185874 A1* | 7/2012 | Cookson | ............... | G06F 9/4843 |
| | | | | 719/313 |
| 2014/0040656 A1* | 2/2014 | Ho | ........................ | G06F 9/5077 |
| | | | | 714/3 |
| 2014/0196022 A1* | 7/2014 | Skutin | ........................ | G06F 8/61 |
| | | | | 717/176 |
| 2015/0121034 A1* | 4/2015 | Steele, Jr. | ............ | G06F 12/1018 |
| | | | | 711/216 |
| 2018/0150284 A1* | 5/2018 | Young | ........................ | G06F 8/31 |

OTHER PUBLICATIONS

AWS, Amazon API Gateway Developer Guide, Jul. 11, 2015, Amazon, Published at https://docs.aws.amazon.com/apigateway/latest/developerguide/models-mappings.html (Year: 2015).*

Whelan, "Concepts of a Framework for Risk Analysis in Multimedia Environmental Systems", 1997, U.S. Environmental Protection Agency (Year: 1997).*

Droppo, "Methods to Register Models and Input/Output Parameters for Integrated Modeling", 2010, International Environmental Modelling and Software Society (iEMSs) 2010 International Congress on Environmental Modelling and Software Modelling (Year: 2010).*

Whelan, "Concepts of a Framework for Risk Analysis in Multimedia Environmental Systems", 1997, Pacific Northwest National Laboratory Richland, Washington 99352 (Year: 1997).*

International Search Report dated Sep. 30, 2016 in corresponding PCT Application No. PCT/US16/42402.

* cited by examiner

COMPONENT-BASED SOFTWARE SYSTEM AND DEVELOPMENT METHOD

CROSS-REFERENCE TO RELATED APPLICATIONS

This Patent Application is a Continuation in Part (CIP) of International Application No. PCT/US2016/042402 filed on Jul. 15, 2016, which claims priority to U.S. Provisional Patent Application No. 62/193,151 filed on Jul. 16, 2015.

BACKGROUND

1. Technical Field

The present disclosure relates generally to component-based software development techniques.

2. Discussion of Related Art

Procedural programming is a programming paradigm, derived from structured programming, based on the concept of the procedural call. Procedures, also known as routines, subroutines, or functions, contain a series of computational steps to be carried out. Examples of procedural programming languages include C, Fortran, and Pascal.

In Object-oriented programming, the focus is on breaking down a programming tasks into objects that expose behaviors (methods) and data (members or attributes) using interfaces. While procedural programming uses procedures to operate on data structures, object-oriented programming bundles the two together, so an "object", which is an instance of a class, operates on its "own" data structure.

However, it can be difficult for a layperson to write a working computer program using Procedural programming or Object-oriented programming. Further, and more importantly, it can be difficult for a layperson to write computer programs or functions for computer programs in such a way that they can be re-used in other applications. Thus, each time the previously written computer program or computer function needs to be applied to a new application; it needs to be modified for the new application, thereby slowing down development. Code reuse is a fundamental way to increase the efficiency of software development. A computer function is the smallest reusable unit or structure of a computer program. A computer function is invoked by a function call in either procedure programming or object oriented programming and implemented at the statement level. Variables corresponding to the arguments of the called function need to be declared, set values and passed to the called function and a value returned by the called function is set to a variable so it can be used in a later computation. These statements produce coupling between the calling functions and the called functions and reduce the reusability of the calling function. When writing software (e.g., a computer function) using either procedure programming or object oriented programming, a lot of application specific data variables need to be declared and used at a statement level. Because these statements are application specific, they are not reusable in other software. These statements are implemented in the same programming language as the reused codes in the software, they are mixed together with the reused codes. Programmers that maintain and modify this type of software need to be able to understand these statements so they can change them when needed to a new application, which is especially time consuming when the statements were previously written by someone else.

An assembly line is a manufacturing process in which interchangeable parts are added as the semi-finished assembly moves from workstation to workstation where the parts are added in sequence until the final assembly is produced. Due to use of the assembly line, a finished product can be assembled faster and with less labor.

BRIEF SUMMARY

According to an exemplary embodiment of the invention, a method of assembling computer code to perform a service is provided. The method includes: converting an input/output (I/O) requirement of the service into a respective data message comprising a plurality of I/O key-value pairs; configuring a part function (PF) of the program to receive the data message as an input argument; generating a variable matching structure (VMS) set (VMSS) including key-pairs that map to arguments of a computation function (CF) and to the I/O key-value pairs; and configuring the PF to call the computation function (CF) using the VMSS, where the CF is configured to perform an operation related to the service.

According to an exemplary embodiment of the invention, a method of executing a computer program configured to perform a service is provided. The computer program includes a part function (PF) configured to receive a data message including a plurality of input/output (I/O) key-value pairs as an input argument. The method includes: retrieving a data structure including a plurality of elements using a name of the data message, wherein each element includes a name and a variable matching structure (VMS); and for each element in the retrieved data structure, using the name of the element to retrieve a computation function (CF) and calling the retrieved CF using the VMS of the element and the data message.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
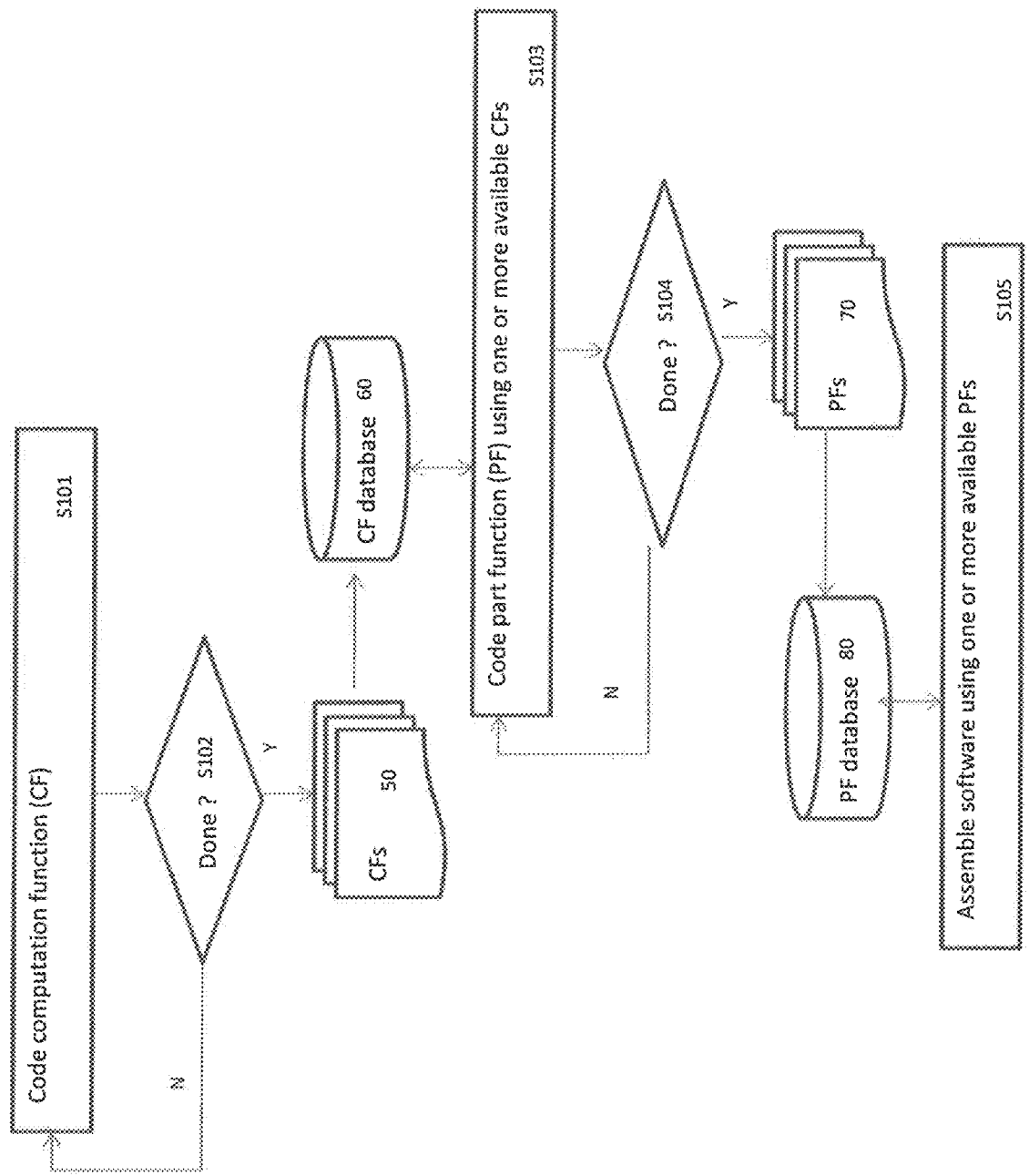
FIG. 1 shows a method of assembling software according to an exemplary embodiment of the inventive concept.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

A component-based software system and development method is described herein. In the following description, numerous specific details are set forth in order to provide a more thorough understanding of the present invention. However, it will be apparent to one skilled in the art that the present invention may be practiced without these specific details. In other instances, well-known features have not been described in detail, in order to avoid obscuring the present invention.

In an embodiment of the invention, a software development method declares all application specific variables outside the code part (i.e., outside the computer functions) of the software in a special data structure referred to as the computation goal data message and its property sheet. The method removes the coupling between computer functions that is prevalent in the prior art that prevents code reusability in the prior art. In the method, computer functions are mutually independent so their reusability is increased. The computer functions can also become pure algorithm functions that need not be related to any application so they can be used in any application. This further increases the reusability of the computer functions. The reusability is achieved by using a part function to implement mapping of variables in the computation goal data messages to arguments of the part functions and executing the part functions and mapping the computation results of the part functions back to the computation goal data messages. The part function behaves like an organizer by assembling functions to achieve a computation goal. The application specific information in software, application specific data variables and using them in computation, are implemented differently from the code (functions) and can be easily identified, understood and modified. The code part of the software in an embodiment of the invention is pure algorithm functions and thus need not contain any application specific information. Embodiments of the invention also provide the advantage of having all application specific variables being represented outside the code (in the CGDM, not mixed into the code) and directed into and from computations by VMS, which makes the software more easily understood, modified, and maintained.

The computer code devices (e.g., methods, classes, libraries) referenced herein may be stored on a data storage medium. The term "data storage medium" as used herein denotes all computer-readable media such as compact disks, hard disks, floppy disks, tape, magneto-optical disks, PROMs (EPROM, EEPROM, Flash EPROM. etc.), DRAMs, SRAMs, and so forth.

FIG. 1 is a high-level diagram showing a method of assembling software according to an exemplary embodiment of the inventive concept.

The method includes enabling a user to code a computation function (CF) (S101). For example, a CF graphical user interface (e.g., CF-GUI) including a text field may be provided by a computer program that enables a user to enter code for the CF. For example, the CF-GUI may include a first button that when selected by the user, informs the program that the user has completed coding of the current CF. As an example, a CF may be coded to perform a calculation, query to a database, or present a graphic or text on a webpage. For example, the calculation could be used to perform a mathematical calculation on results returned by the query. In an embodiment, each CF is given a unique name by the user and coded to receive one or more input parameters (herein referred to as CF input parameters) and to return an output parameter (herein referred to as a CF output parameter. For example, the CF input and output parameters could be integers, floats, strings, arrays, pointers, etc.

The method then includes determining whether the user is done coding the CFs (S102). For example, selection of the first button could indicate that the user desires to create another CF. For example the CF-GUI may include a second button that when selected by the user informs the program that the user is done creating the CFs 50. The completed CFs can be stored in a CF database 60 so they are available to other coders.

The method next includes enabling a user to code a Part Function (PF) using one or more of the available CFs (S103). For example, the program may present a second GUI (e.g., PF-GUI) with a selectable list of the available CFs stored in the CF database 60 in the GUI and a pane showing which CFs have been selected and their order of execution within the PF. For example, the user can select one of the available CFs each time an instance of the corresponding CF is needed for the corresponding PF and insert the selected instance into the pane in an order the user desires the CF instance to be executed.

The method next includes the program determining when the user is done creating all the PFs (S104). For example, the PF-GUI may include a graphical button that when selected by the user indicates the user is done creating all the PFs 70. The PFs 70 can be stored in a PF database 80 so they are available to other coders.

The method then includes the program enabling a user to create software using one or more of the available PFs 70 that are stored in the PF database 80 (S105). For example, a computer program may be used to launch a third GUI that presents a text field to enable a user to enter connecting code and a selectable list of the available PFs 70. For example, the user can select a PF from the list to insert the corresponding PF into a certain location in the connecting code of the computer program. In an embodiment, the computer program may be in a form that is interpreted by an interpreter.

Figure 2:
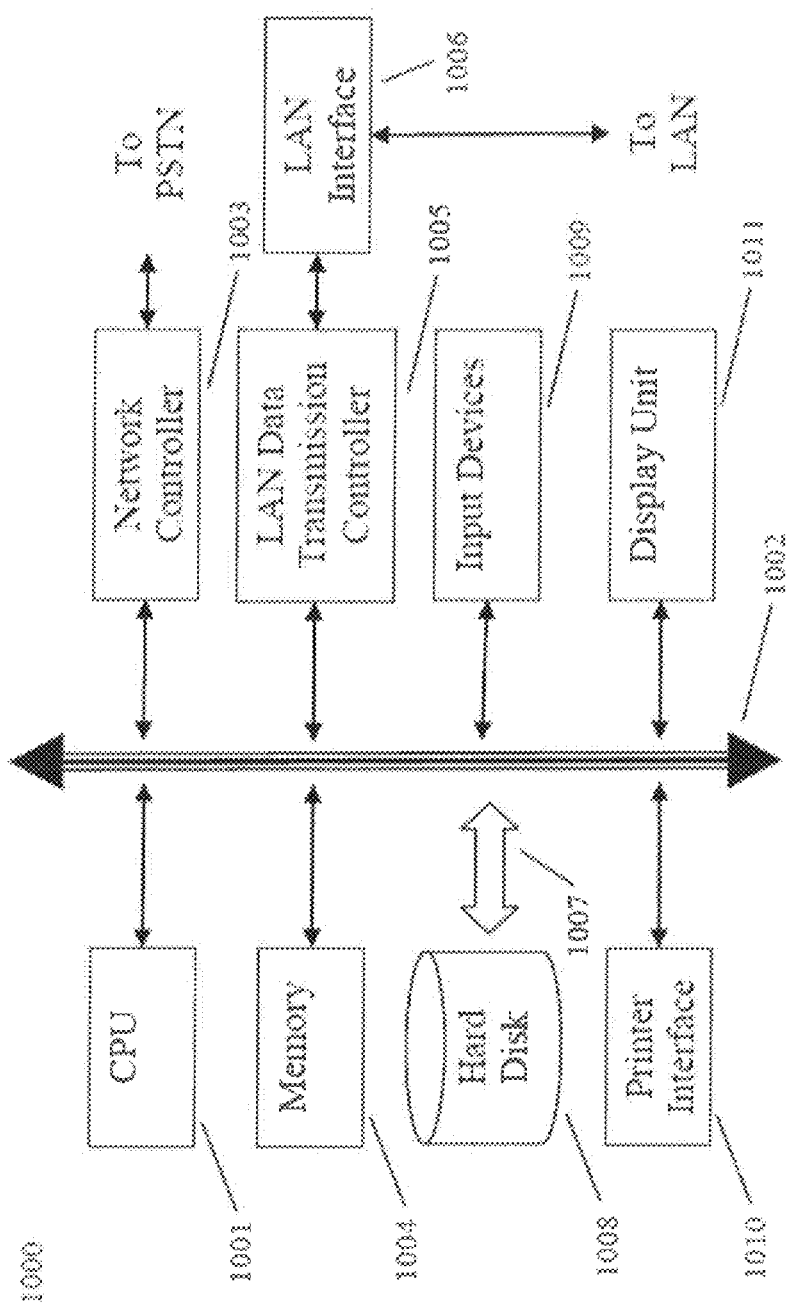
FIG. 2 illustrates an exemplary computer system that may be used to execute the method.

FIG. 2 illustrates an exemplary computer system 1000 that may be used to implement the method of FIG. 1. Referring to FIG. 2, the computer system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 via a link 1007. The above described GUIs may be presented on the Display Unit 1011. The above-described CFs 50, PFs 70, program, and assembled software may be stored on the memory 1004 and/or the hard disk 1008.

Figure 3:
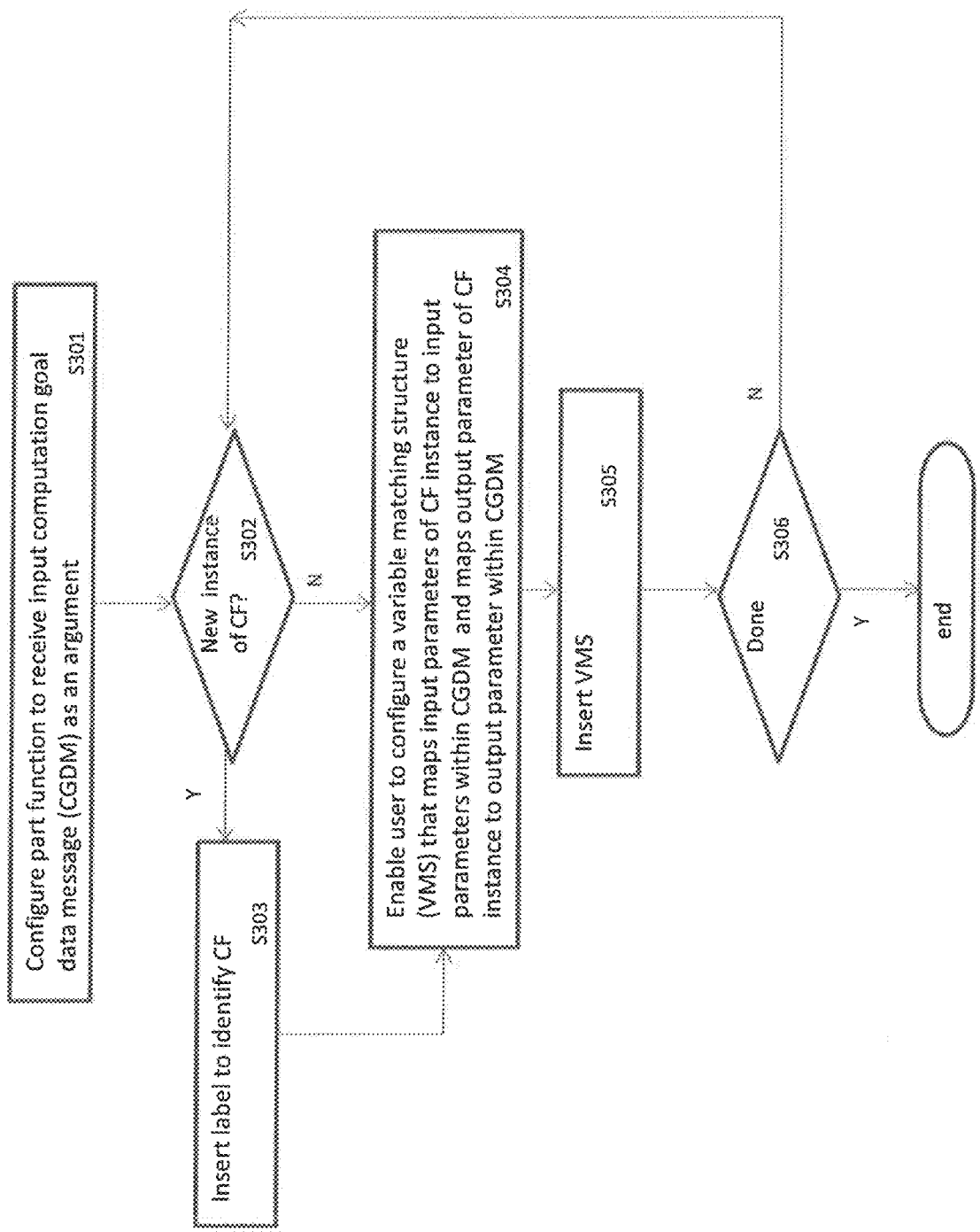
FIG. 3 illustrates a method of configuring a part function of the software according to an exemplary embodiment of the inventive concept.

FIG. 3 illustrates a method according to an exemplary embodiment of the invention that may be used to implement step S103 of FIG. 1 to code a PF. Referring to FIG. 3, the method includes configuring a Part Function (PF) to receive an input of a Computation Goal Data Message (CGDM) (S301).

In an exemplary embodiment, a CGDM has i) input and output parts, ii) a name-value form (e.g., all values, substructures of values that will be assigned to a variable in any later computation should have name), and iii) its structure follows some syntax rules (e.g., HTML, XML, or JSON). Two CGDMs are the same if i) both of their input and output parts have the same structures, and ii) all names in the structures are the same. The CGDM is used as an argument of a PF. Any PF can only have one argument. A PF can process one or more than one CGDM. Each CGDM has a VMSS corresponding to it. A VMSS instructs a PF how to achieve the computation goal of a CGDM.

The names in CGDM may be referred to as working names, where they represent variables for the application data.

All PFs have the same interface. For example, each Part Function is configured to be invoked with the CGDM, which may be referred to as an invocation parameter or an argument of the Part Function. The CGDM includes Input parameters X (e.g., Input: X) and output Parameters Y (e.g., Output:Y), where X and Y can be any data structure that has a name (key)-value form. In the X part, the names have values, and the Y part's values are blank to be filled by the Part Function. Two CGDMs are the same if both their Input Parts and Output Parts have the same structures and all names (keys) in the structures are the same. Each CGDM has a unique name. A CGDM with values of all names (keys) of its Input Part set is called an instance of the CGDM. A PF returns a data structure the same as the Output part of the CGDM with values filled. A PF accepts any CGDM as an argument.

A PF contains one or more Computation Functions (CFs). Any function can be a CF. A PF can accept any CGDM as an argument because how a PF executes the CFs is not determined by the CGDM only, but also by a data structure called a Variable Matching Structure (VMS). A PF executes a CF through a CF Caller. A CF Caller accepts a CGDM, a VMS and a CFResults structure as arguments. It provides a uniform interface for the PF to call. A CF Caller: i) prepares the arguments of the CF and a call according to the CGDM and VMS, ii) sets the output part of the CGDM according to the CGDM and VMS, and iii) saves the result to CFResults for possible use by later CF execution.

In an embodiment of the invention, two types of CF functions may be present, i) a Complete CF and ii) a Partial CF. A Complete CF does not call a PF, and has the interface requirement completely done. A Partial CF calls a PF, and has the interface requirement partially done. How the interface requirement is done depends on what PF is called, and what the PF is configured to do.

The VMS maps data between CFs and CGDM, so the CFs has no direct relation with the CGDM, that is no relation with application data variables. The CFs can be pure algorithm functions. The VMS separates a CF from a CGDM, if the CGDM is sent by a partial CF, the CFs processing the CGDM are also not bound to the partial CF. There is no calling actions between any CF, so there is no coupling between CFs and they are mutually independent of one another and each CF can be independently developed to implement an algorithm without being aware of the other algorithms.

When a CF calls a PF, it prepares a CGDM, and passes the CGDM as an argument to the called PF. The naming of values in the CGDM may follow a Consistent Naming Rule. The names of PFs a CF calls and names of the CGDMs it creates can be specified in the VMSs of the CF.

The VMSSs provide control for connecting the CFs, the Partial CF provide control for connecting the PFs. Software can be formed by manipulating VMS and VMSS for connecting the PFs and the CFs according to a given design.

For one CGDM, we call the execution sequence of all PFs (may involve more than one PF) and CFs to achieve the computation goal of the CGDM the Computation Structure of the CGDM.

Figure 6A:
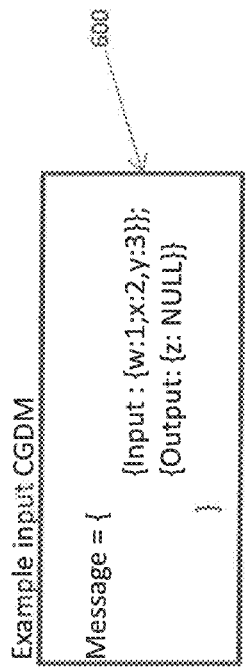
FIG. 6A illustrates an exemplary data message that may be used in embodiments of the inventive concept.

FIG. 6A is an example of a CGDM that could be passed as an argument to a Part Function. In this example, the CGDM has a JavaScript Object Notation (JSON) format. The CGDM includes one or more input key-value pairs and an output key-value pair. The CGDM may include identifiers that can be used by a parser or an interpreter to extract the input and output key-value pairs.

In the example shown in FIG. 6A, an input parameter identifier in a CGDM is entitled 'Input:' and an output parameter identifier is entitled 'Output'. For example, after a parser parsing a CGDM recognizes an identifier of 'Input', the parser can assume that the next elements located between a next open brace '{' and closed brace '}' are key-value input parameter pairs. For example, after a parser parsing the CGDM recognizes an identifier of 'Output', the parser can assume that the next elements located between a next open brace '{' and closed brace '}' are key-value output parameter pairs. For example, the key-value pairs may be separated by a semicolon ';', and a key and value of a given key-value pair may be separated by a colon ':'.

While FIG. 6A shows use of the term 'Input:' to denote input parameter key-value pairs, use of the term 'Output' to denote output parameter key-value pairs, use of the term '{' to denote the beginning of key-value pairs, use of the term '}' to denote the end of key-value pairs, and use of the term ':' to enable a parser to distinguish a key from a value, the invention is not limited thereto. For example, these terms may be changed to other words or symbols, as desired by the implementer.

Figure 6B:
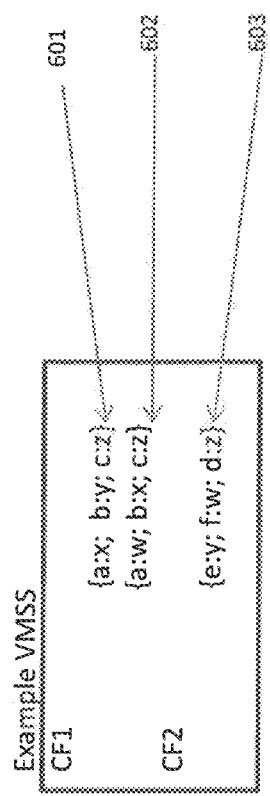
FIG. 6B illustrates an exemplary variable matching structure set that may be used in embodiments of the inventive concept.

Referring back to FIG. 3, the method includes determining whether the user desires the Part Function to call a new instance of a Computation Function (CF) (S302). A new instance means that this is the first time a specific CF has been requested for insertion or the requested insertion would cause an instance of a CF (e.g., CF2) to be inserted after a different CF (e.g., CH). For ease of explanation it is assumed that only a first Computation Function CF1 and a second Computation Function CF2 as shown in FIG. 6B are available. If the user has requested a new instance of a CF, the method inserts a label to identify the particular CF (S303). For example, since the user has requested that the first Computation Function CF1 be used, the method inserts a label such as 'CH' into a variable matching structure sequence (VMSS) to identify that the first computation function CF1 is to be called. The VMSS, when completed, will include a sequence of pairs, where each pair includes a name of a given CF (e.g., CF1) and a VMS (e.g., CFName, VMS). For example, a completed VMSS could include pairs: ({CF1, VMS1}, . . . , {CFN, VMSN}}, where N is 1 or more. A VMSS is associated with a CGDM, and all VMSs in a VMSS completely fill all names' (keys') values of the CGDM. That is, the VMSS fulfills the computation goal for the CGDM. A VMSS instructs a PF how to achieve the computation goal for the CGDM.

Next, the method includes enabling the user to configure a variable matching structure (VMS) that maps input parameters of a CF instance to input parameters within the CGDM and maps output parameters of the CF instance to output an output parameter within the CGDM (S304). A VMS instructions a PF how to execute one CF.

Figure 6C:
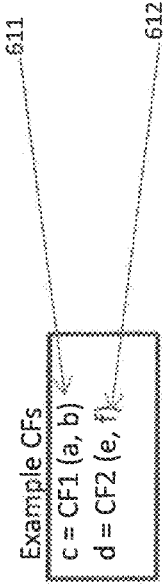
FIG. 6C illustrates examples of input and output arguments of exemplary computation functions.

For example, FIG. 6B shows an example, of a first VMS 601 being configured for a first CF1 611 with a plurality of key pairs, where each key pair is separated by a semicolon ';'. For example, the first key 'a' in the first key pair 'a:x' of the first VMS 601 corresponds to the first input parameter 'a' of the first CF1 611 and the second key 'x' in the first key pair 'a:x' corresponds to the second input parameter 'x:2' of the CGDM 600 shown in FIG. 6A. For example, the first key 'b' in the second key pair 'b:y' of the first VMS 601 corresponds to the second input parameter 'b' of the first CF1 611 and the second key 'y' in the second key pair 'b:y' corresponds to the third input parameter 'y:3' of the CGDM 600 shown in FIG. 6A. For example, the first key 'c' in the third key pair 'c:z' of the first VMS 601 corresponds to the output parameter 'c' of the first CF1 611 and the second key 'z' in the third key pair 'c:z' corresponds to the output parameter 'z:NULL' of the CGDM 600 shown in FIG. 6A. FIG. 6C illustrates examples of calls to the CFs. In the case when an argument of a CF is a composite type, if it maps to a same composite type in the Input part of the CGDM, if we assume the argument's name is C and the name of the same type (a sub-structure of the Input part of the CGDM) is D, the mapping can be specified as 'C:D'. If it does not map to a same composite type in the Input part of the CGDM and its members map to names distributed in the Input part of the CGDM, mapping for each member of the composite type needs to be specified. If we assume the composite type is T and the names in the Input part of the CGDM are d1, d2, . . . , the mapping can be specified as 'C, T('member1:d1', 'member2:d2' . . . )'. If C is an array type, the mapping can be specified as, 'C: Array[d1, d2, . . . ]'.

Next the method inserts the configured VMS into the VMMS associated with the Part Function CF (S305). The VMS is inserted so that a parser can recognize that it is associated with the identified CF. For example, the first VMS 601 shown in FIG. 6B below label 'CF1' is an example of a VMS configured for a PF being inserted into a VMSS and associated with the first Computation Function CF1. The method then includes determining whether the user is done (S305). For example, a GUI may be used by the user to select Computation Functions (CFs) and to indicate that they are done entering Computation Functions (CFs). If the user selects another Computation Function (CF) or another instance of the previously selected Computation Function (CF), the method proceeds to step S302. For example, if the user were to enter another instance of the same CF (e.g., CF1 again), and send the CF different parameters of the CGDM, the method would proceed to step S304. For example, this could result in insertion of the second VMS 602 under the same label (e.g., CF1) that identifies the first Computation Function CF1. However, if the user selects a new Computation Function (e.g., CF2 612), it could result in insertion of the second label (e.g., CF2) and the third VMS 603, as shown in FIG. 6B.

Figure 7:
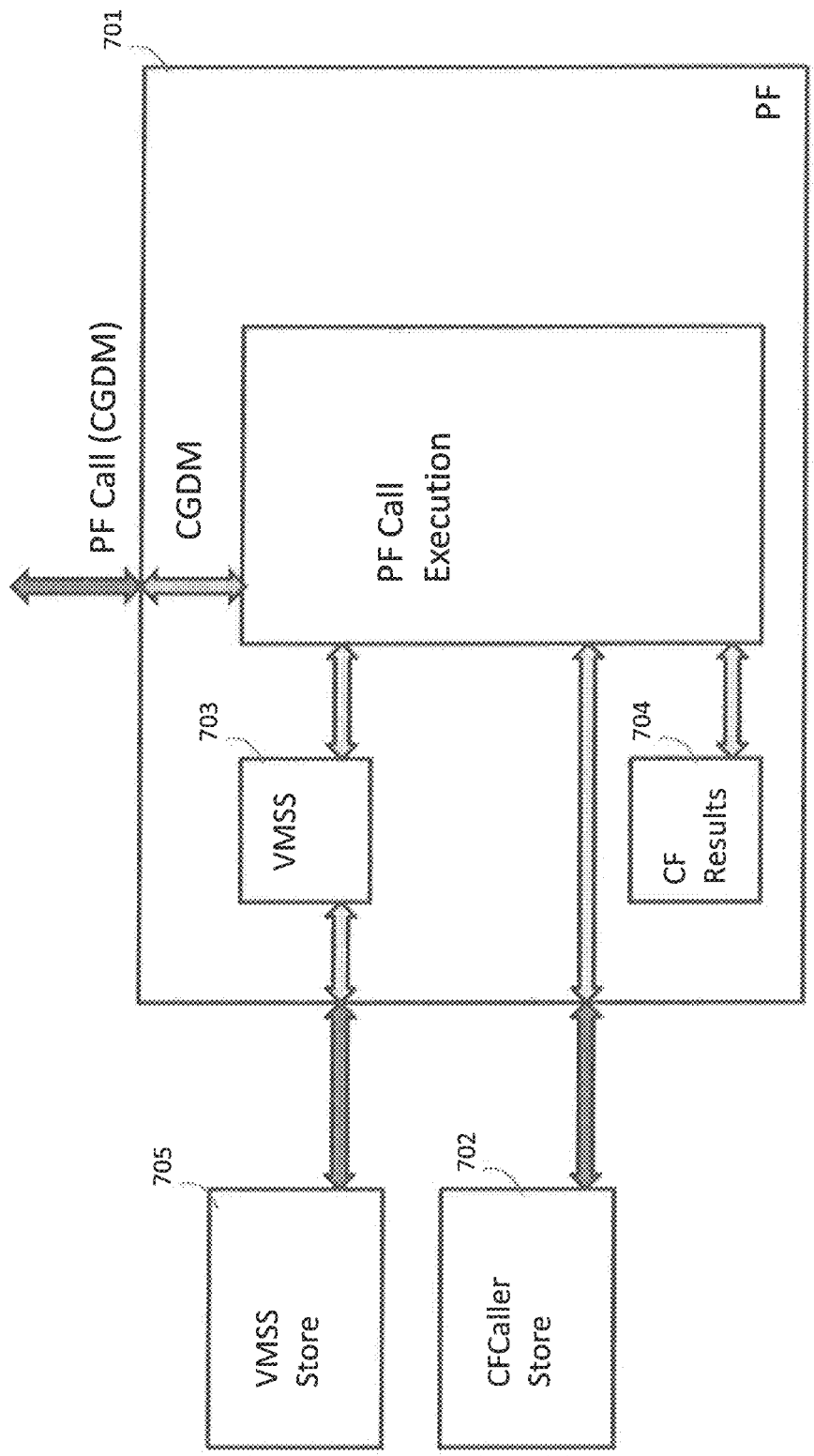
FIG. 7 illustrates a flow diagram showing execution of an part function of the assembled software according to an exemplary embodiment of the inventive concept.

Except taking values from the Input of the CGDM, a CF's argument can also take a value from the results of one or more previously executed CFs. For example, when a PF executes a first CF, it can store a result of executing the CF into a data structure (e.g., CFResults structure) or list that is internal to the PF, so that if the PF re-executes the same first CF or a second CF, the result is available to either CF so that the corresponding CF can operate on the result if necessary. As shown in FIG. 7, when a PF 701 is called through a PF Call, the PF 701 executes a CF through a CFCaller function. The CFCaller function may be loaded from an external storage region 702 (e.g., CFCaller Store) that stores a plurality of available CFCaller functions. A CFCaller function takes the CGDM, a VMSS 703 associated with the CF and the CFResults structure 704 as input. The VMSS 703 may be loaded from an external storage region 705 (e.g., VMSS Store). The CFCaller function performs the following: 1) declares the arguments of the CF and initializes each argument using the VMSS 703, the CGDM, and CFResults within the CFResults structure 704; 2) executes the CF with the arguments; and 3) adds the results to the CFResults structure 704 and sets the Output of the CGDM (e.g., CGDM.output) according to the VMSS 703. In an embodiment, each CF has an associated CFCaller function and each CF has the same interface. The VMSS Store contains all the VMSS for all the CGDM the PF is called with. The CFCall Store contains the CFCaller functions associated with all the CFs the PF contains.

Figure 4:
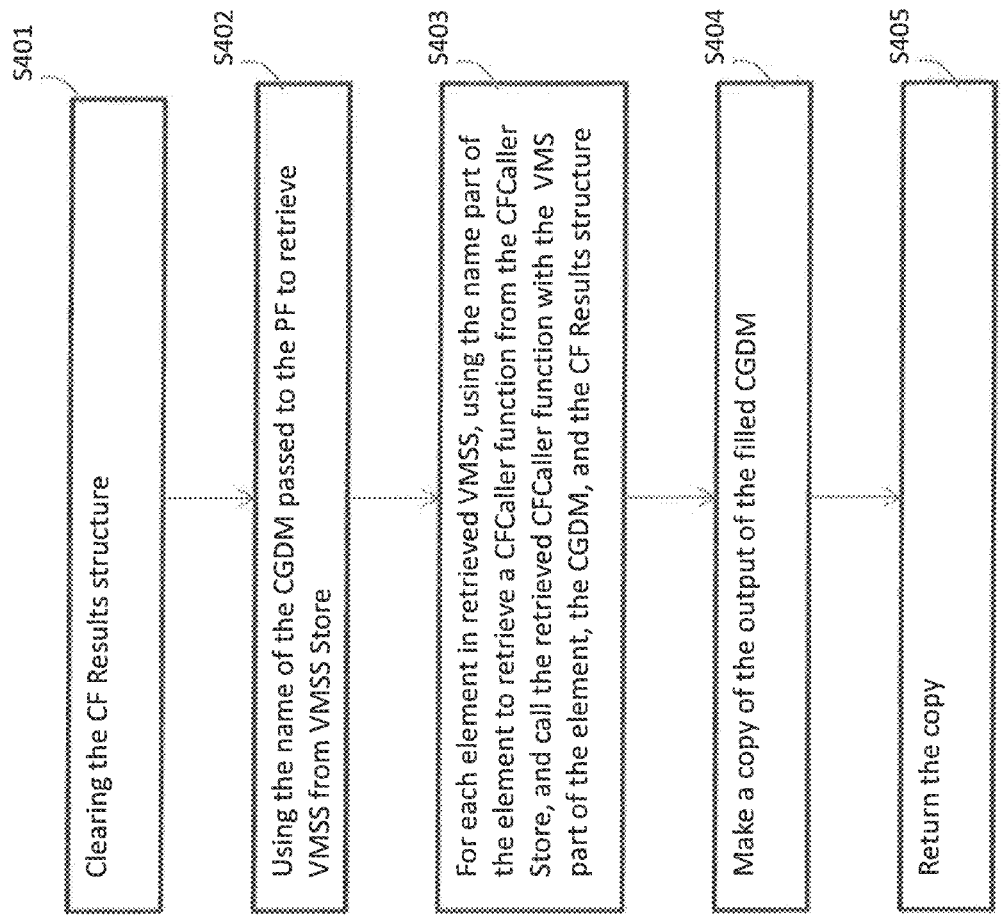
FIG. 4 illustrates a method of executing a part function of the software according to an exemplary embodiment of the inventive concept.

FIG. 4 illustrates a method for executing a PF Call for a received CGDM according to an exemplary embodiment of the invention. The method includes: clearing the CF Results structure 704 (S401); using the name of the CGDM to retrieve the corresponding VMSS 703 from the VMSS Store 705 (S402); for each element in the VMSS 703, using the name part of the element to retrieve the CFCaller function from the CFCaller Store 702 and call the retrieved CFCaller function with the VMS part of the element, the CGDM, and the CF Results structure 704 (S403); make a copy of the output of the CGDM (now filled with values) (S404); and return the copy (S405).

A CF can call others PFs. The way to do it is to create a CGDM and pass the created CGDM as an argument to the call. If a CF passes a value in the CGDM it computes to the CGDM it creates, the CF should use the same name as in the CGDM it computes. If a CF passes a value in the CF Results structure 704 to the CGDM it creates, it should use the same name as in the CF Results structure 704. This is called a Name Consistent Rule. When a CF creates a CGDM to call another PF it should follow the Name Consistent Rule.

Because all PFs have the same interface, the difference of calling different PFs is only by names. PF name arguments can be added for a CF for all PFs it calls, then which PFs it calls can be specified in the VMS of the CF. Also the names of the CGDMs it creates can be specified in the VMS. So what PFs a CF calls and what CGDM names it uses can be determined after development of the CF.

In an embodiment, all data storage parameters are in the name (key)—value form. The data storage format can have different syntax rules with the CGDM.

The names in the data storages and the CGDMs may be created by different users and at different times, and therefore may not be consistent. A set of name-values are called consistent if the same names in the set describe the same semantic meaning for the named values and the different names in the set describe the different semantic meaning for the named values. A set of consistent name-values forms a Name Space (NS). A PF and its CFs need to operate in one NS. If the CGDMs and data storages are not in one NS, a conversion can be applied to the CGDMs to convert them into one NS. For one CGDM, we call the execution sequence of all PFs and CFs to achieve the computation goal of the CGDM.

Figure 5:
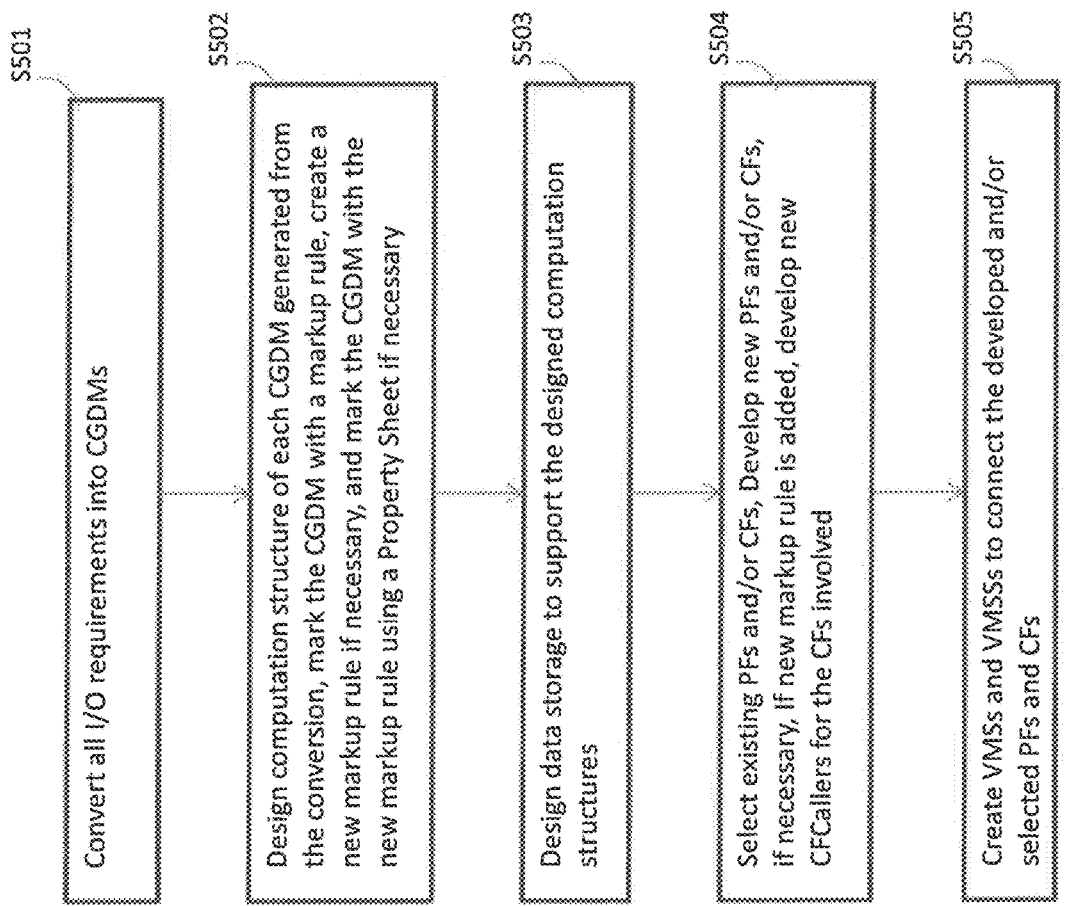
FIG. 5 illustrates a method of assembling software according to an exemplary embodiment of the inventive concept.

FIG. 5 illustrates a software development process according to an exemplary embodiment of the invention. The process includes: converting all input and output requirements of the software into the CGDMs format (S501); designing the computation structure of each CGDM generated from the converting, marking the CGDM with a markup rule, creating a new markup rule is necessary, and marking the CGDM with the new markup rule using a Property Sheet, if necessary (S502); designing the data storage to support the designed computation structures (S503); selecting existing PFs and/or CFs; developing new PFs and/or CFs, if necessary, if new markup rule is added, developing new CFCallers for the CFs involved (S504); and creating VMSs and VMSSs to connect the developed and/or selected PFs and CFs (S505).

In an embodiment, step S505 is implemented by calling a CGDM without the values of the Input Part, i.e., the Name Instance (NI) of the CGDM. The NI is the CGDM with both the Input and Output parts without values. In an embodiment, each CF that calls other PFs has Developing Mode (DV) processing. In DV, the CG takes a NI of the CGDM it computes and outputs the NIs of all CGDMs it creates for the CGDM it computes to a persistent data storage (e.g., like a file). The output NIs specifies the contents of CGDMs of the called PFs. The VMSs and VMSSs can be created accordingly.

Figure 8:
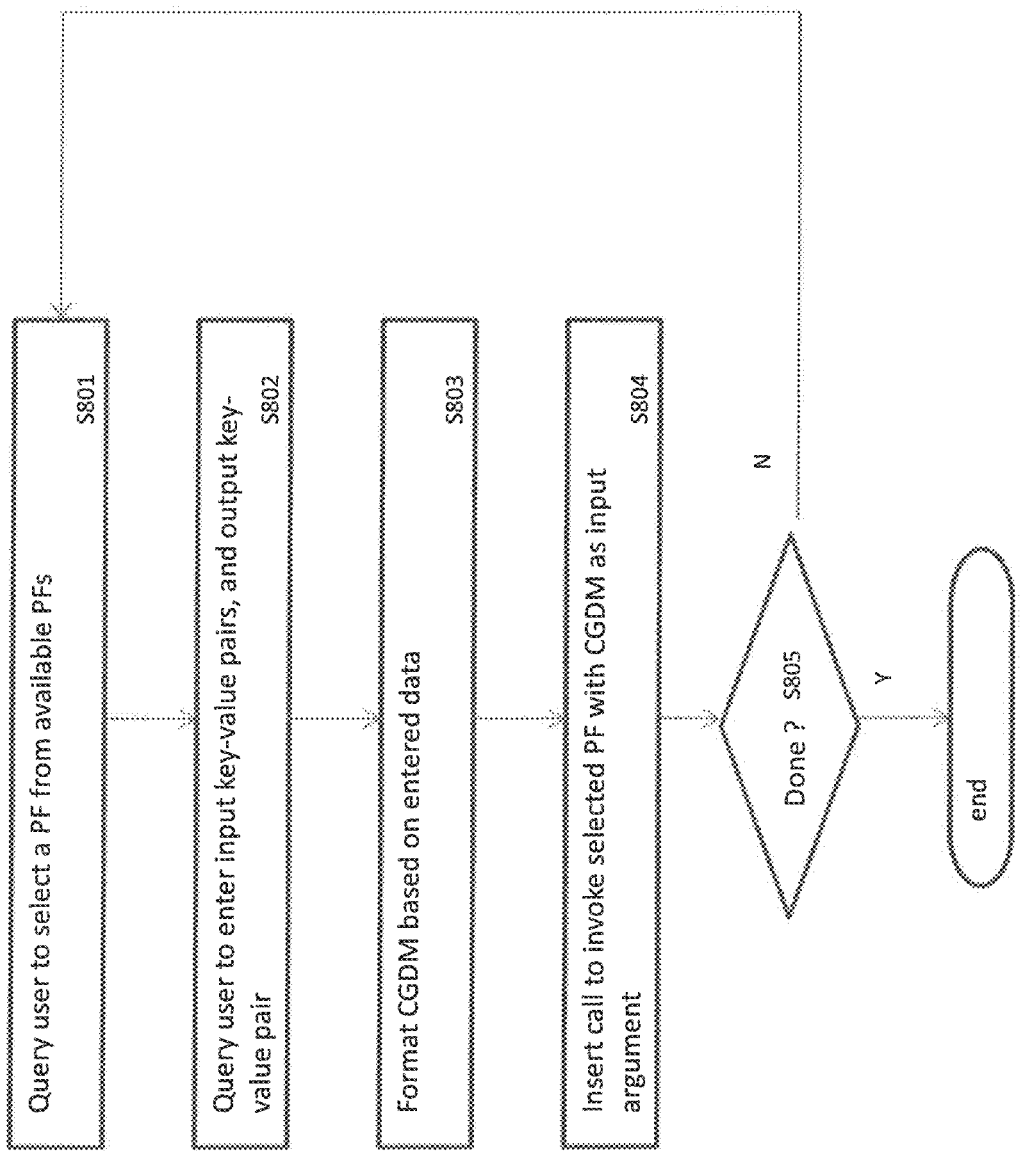
FIG. 8 illustrates a method of enabling a user to assemble software according to an exemplary embodiment of the inventive concept.

FIG. 8 illustrates a method of generating software using one or more of the available Part Functions (PFs), according to an exemplary embodiment of the inventive concept. The method includes: querying a user to select a PF from available PFs (S801); query user to enter input name (key)-value pairs and an output key-value pair (S802); format a CGDM based on the entered data (S803); insert PF call with formatted CGDM as input argument (S804); determining whether the user is done making PF calls (S805). If the user is not done, the method proceeds to step S801 to query the user to select a new PF. If the user is done, the method terminates.

Figure 9:
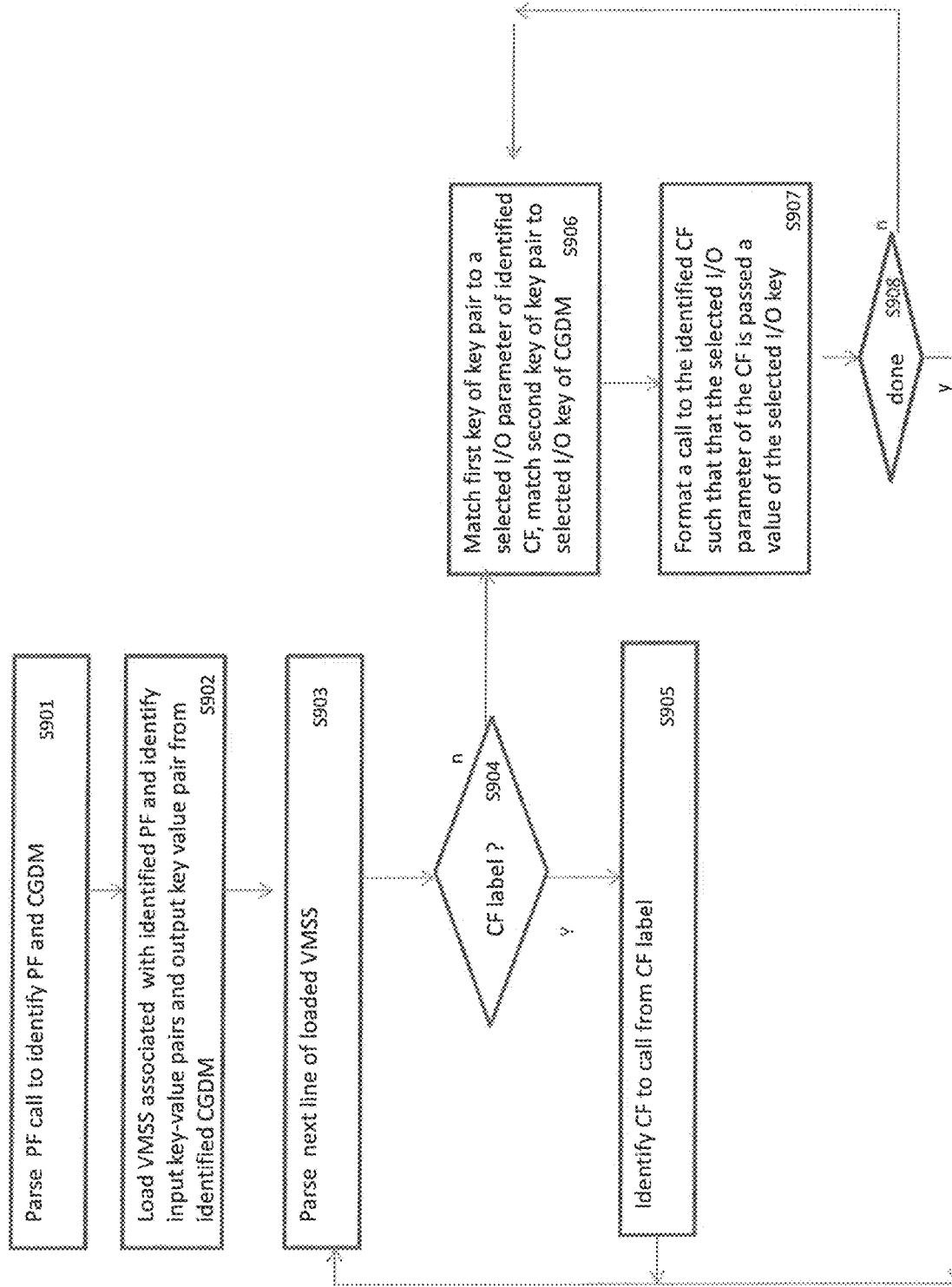
FIG. 9 illustrates a method of executing a part function according to an exemplary embodiment of the inventive concept.

FIG. 9 illustrates a method of interpreting software including a PF call according to an exemplary embodiment of the invention. The method includes parsing the PF call to identify a given PF and a CGDM passed to the PF call as an argument (S901). The method then includes loading a VMSS associated with the identified PF and identifying input key-value pairs and output key-value pairs within the identified CGDM (S902). The method then includes parsing a next line of the loaded VMSS (S903). The method then determines whether the parsed line includes a CF label (S904). For example, if the next line is the first line of the VMSS depicted in FIG. 6B, then the method would conclude that it has identified a CF label of CF1. If it is determined that a CF label has been identified, the method identifies a particular CF to call from the determined CF label, and parses the next line of the VMSS. Then if the method determines that the next line is not a CF label (i.e., the next line corresponds to a VMS), the method matches the first key of a current key pair of the VMS to a selected I/O parameter of the identified CF, and matches the second key of the current key pair to a selected I/O key of the CGDM (S906). For example, if VMS 601 is parsed, and the current key pair parsed is 'a:x', and the identified CF is CF1 611, then the method matches first key 'a' of current key pair 'a:x' to input parameter 'a' of CF1 611, and matches second key 'x' of the current key pair to Input key 'x' of the Input parameter x:2 of CGDM 600. Then, the method includes formatting a call to the identified CF such that the selected I/O parameter of the CF is passed a value of the selected I/O key (S907). For example, input parameter 'a' of CFL1 611 is passed value '2' since 'first key 'a' is matched to 'x' and x is set to 2 (e.g., 'x:2'). The method then repeats these matching steps for every key pair of the VMS. The method determines whether it has parsed the last key pair of the VMS to determine whether it is done (S908). If the method is not done it advances to the next key pair of the VMS, by proceeding to step S906. If the method is done, it proceeds to step 9002S903 to parse the next line of the VMSS to find either a new CF label or another VMS under the previously identified CF label.

While FIG. 6A shows use of a JSON format for a CGDM, the invention is not limited thereto. For example, the JSON format can be replaced with a HyperText Markup Language (HTML) format or an Extensible Markup Language (XML) format. We define a Markup Rule as the Rule to expand the content of a CGDM using the CGDM's syntax rules such that for any input instance of the algorithm there is an expanded content corresponding to it, and the input instance and its full data features can be deducted from the expanded content. A Markup Rule is associated with an algorithm.

In an embodiment of the invention, input data messages to the software are in the HTML format, the CGDM are in the JSON format, and the data storages are relational databases, which enables a web development environment. The Part Functions that handle input run in a web browser, and may be referred to as frontend Part Functions. The Part Functions that run a server side may be referred to as Backend Part Functions. The Backend Part functions may be connected to a database.

The CFs can be analogized to computer chips with their arguments as input and output pins of these chips. The CGDM can then be analogized to a data bus with names in the name-value pair as lines of the data bus. The data bus has two directions of data flow, the input and output. Computations are achieved by connecting the chips (i.e., the CFs) to the data bus. The software development can then be like hardware development. For example, the software can be developed by dragging and dropping CFs (chips) and drawing lines between the CGD (data bus) and the CFs (chips). In an embodiment, hardware could be developed from this concept, where the hardware includes a plurality of computer chips connected to a common data bus, and each computer chip includes a processor or microprocessor that implements a given CF.

One PF processing HTML input can be one that handles linear cascade inputs. An example, of the linear cascade inputs is the inputs for selecting state, then selecting county, and then selecting city. The inputs are a list of <select>s and a current selection, the output is the next option array. The markup rule can be any rule that expresses a list. An example, of the markup rule is, mark the first list as<select Cascade="cs1" cs1="1" mName="name1" . . . >, mark the second list as<select Cascade="cs1" cs1="2" mName="name2" . . . >, the third<select Cascade="cs1" cs1="3" mName="name3" . . . > and so on. The Cascade is the computation name, Cascade="cs1" declares an instance cs1, cs1='n', the n declares the position in the list. The PF is triggered by the onSelect event of the <select> elements. The same onSelect event handler cascadeHndler is set for all <select>. The cascadeHndler is the Part Function that handles this type input and output requirements. The handler's algorithm is:

```
Get instance name from Cascade="instance_i";
Get position number from instance_i="n";
Get selected value v and name n1 of the current <select>
Get name n2 of the next <select>
Send a data message of the form
    {{ "input":
        {"n1" : v}
    },
    { "output": {
        [{"n2":0}]
    }}
    to a backend component
    Set return result to the next <select>
```

Any number cascade input of any length and with any application meanings in one HTML data message can be handled by this Part Function. It can be assumed that the Part Function contains only one CF that implements the algorithm mentioned above. The Part Function implements a pure cascade and it is not related the application meaning assigned to the cascade. For example, either it's Country-State-County or Grade-Class-StudentName. A cascade implementation with smaller function granularity is given later.

Another case of input is referred to as star cascade input, where the options of some <select> s is decided by one <select>, like the case where the available size and color options is decided based on which cloths have been chosen. For the center mark <select star="star1" star1="name list of all end select node">. No end node <select> is needed to be marked. When the selection of the center <select> is done, a data message of the form,

```
{
    {"input":
        {"centerName" : "v"}
    },
    { "output": {
        [{"n1", ""}],
        [{"n2", ""}],
        ...
    }}
}
``` is sent to the backend, where n1 and n2 are the name of end nodes. When the returned values are not arrays but a single value and the end nodes are text or number inputs, this becomes auto-fill, like a customer's name is chosen, its address is auto-filled.

Input suggestion handling is the reverse operation of auto-fill. Except the current input value and some other input values can restrain options of the current input, like the department and position inputs restrain the employees' name input suggestion. When the current input value is text, with respect to the suggested values it may have more than one interpretation, for example it may mean the suggested values start with this text or contain the text. So further information needs to be provided for the value

```
{
    {"input": {
        {"otherValues1": "v1"},
        {"otherValues2": "v2"},
```

-continued

```
        {"currentValue": {
            {"value": "v3"},
            {"type": "LIKE"}
        }
    }
    ...
},
{ "output": {
    [{"n1", ""}]
    }
}
}, where n1 is the current input element's name.
```

Ranges input can also be implemented having a markup rule such as, the first element <input rangeInput="ri1" ri1="1" . . . >, the second element<input rangeInput="ri1" ri1="2" . . . > or for selection inputs the first element <select rangeInput="ri1" ri1="1" . . . >, the second element<select rangeInput="ri1" ri1="2" . . . >. The algorithm is before accept current input check if it satisfy the constrain set by the other input or one input restrain the options of the other input. Because of the input format choices there may exist a few different type range input, like date range input, selection range input, numerical value range input.

A form contains some number of different types of input elements (text, numerical, list options, range input, cascade input . . . ). The action of form submit is to collect (name, value) pair for all element. The markup rule for form submission is defining a type symbol for each type of input element. Different type means the name value access needs to use different ways. Mark each input element for its proper type. The algorithm for the form submission is:

```
For each type {
    Get all input element for the type
    For each input element of the type {
        Get the name and value, pack the name value into JSON
        format.
    }
}
mark the data message as ADD or MODIFY
send the JSON data message to a backend address
```

A form submission can either be an ADD of new data or MODIFY the old data. For modification the data are first loaded from backend, with some extra data, the keys or reference numbers. Then the data are modified and send to backend. The extra key data can be handled by a similar mechanism such as cookies. One implementation of cookies is to use some hidden elements of the HTML with special tags. For adding new data, this extra key data is not used. So the PF for form submission can distinguish between modify and add. A form PF can handle form submission of any forms with any number of input elements of the defined types.

A search page contains one or more data input elements as search conditions, and a two dimensional data grid to display the search results. Each column of the data grid can be named. For submission of a data search, the JSON data message send to backend has two parts, the search condition part and data grid part of empty two dimensions array part as shown:

```
{
    {"input":{
        {"name1": "value1"},
        {"name2": {
```

```
            {"Max": {"value": "v2", "EQUAL": "true"}},
            {"Min": {"value": "v3", "EQUAL": "false"}}
        }},
        ...
    },
    {"output": {
        [[{name4:0}, {name5:0},...]]
    }}
}, where name2 specifies range values input, EQUAL is true
means <= pr >= and false means < or >.
```

The search condition part can be named and marked types and packed up the same way as form for ADD.

One embodiment of the backend is to choose the relational database as the data storages and the data messages received and sent between data messages are in JSON format. For PFs that need to interact with a relational database, database schema names need to be used. For working names in the data message that correspond to a database schema names, they are converted to a database schema name. A column name of a table is in the form tableName.columnName. The PF that handles insertion in a single table can be implemented with a CGDM as follows:

```
{"input": {
    {"column1": "table1.column1"},
    {"column2": "table1.Column2"},
    {"column3": "table1.Column3"},
    ...
}}
```

For insertion into one table, each column is treated the same by the SQL insert statement, so there is one type of data. The CGDM that handles such insertion becomes,

```
{ input: {
    {"table1.column1", ""},
    { "table1.Column2", "" },
    { "table1.Column3", "" },
    ...
}}
```

For insertion into a master-detail table, the CGDM is,

```
{"input": {
    {"Master": {
        { "table1.column1": ""},
        { "table1.Column2": ""},
        { "table1.Column3": ""}
        ...
    }}
    { "Detail": {
        [{"table2.column1": ""},
          { "table2.Column2": "" },
          { "table2.Column3": "" },...] }}
}},
``` where the CGDM includes data for the master table and an array of data for the detail table.

The PF that handles update into one table has a CGDM as follows:

```
{"input": {
    "primarykey": {
        { "table1.column1": ""},
        { "table1.Column2": ""},
        ...
    },
    {"values": {
        { "table1.Column3": "" },
        { "table1.Column4": ""},
        ...
    }}
}
```

The PF that handles update into a master-detail tables has a CGDM as follows:

```
{"input": {{"m_Primarykey": {
        { "table1.column1": ""},
        { "table1.Column2": ""},
        ...
    }},
    {"m_values": {
        { "table1.Column3" : ""},
        { "table1.Column4" : ""},
        ...
    }},
    {"d_Primarykey": {
        { "table2.column1" : ""},
        { "table2.Column2" : ""}
        ...
    }},
    {"d_values": {
        { "table2.column3" : ""},
        { "table2.Column4" : ""}
        ...
    }},
    {"d_data": {
        [{"table2.column1" : ""},{ "table2.Column2" : ""},...,
          { "table2.Column3" : ""},{ "table2.Column3" : ""}...]
    }}
}
```

For the below examples, it is assumed that an SQL select statement takes as form such as Select [A: output section] from [B: table section] where [C: conditions section] group by [D: aggregation section] having [E: aggregation condition] order by [F: order section]. The data for its input and output are divided into six sections. We assume the section A contains the columns of the tables that appear in the section B or SQL function on the column of the tables that appear in the section B; the section B contains tables and join relations; the section C contains condition of the form column=value or column>(=)value or column<(=)value, column LIKE value SQLFunction(column) in the same relations; the section D contains column of SQLFunction (column); the section E contains columns of SQLAggregateFunction(column)=or <(=) or >(=) values; and the section F contains columns.

The tables and their join relation information needed in the section B can be obtained from the schema of the database, but the join type information should come from application. An array structure can be chosen to represent the relation between two tables in the CGDM of the PF that implement this select statement. The CGDM of this select statement is,

```
{{"input":
    {{"requirement": {
        [{ "tableA.column8": "tableA.column8"},
```

```
{ "total1": { "tableB.column4":
    {
        "FUNC": "SUM"
    }}
},
...]}
},
{"table": {
    {[ "tableA", "tableB", "joinType",
    "tableA.column1= tableB.column2",
    "tableA.column3= tableB.column4", ...],
    [ "tableC", "tableD", "joinType",
    "tableC.column1= tableD.column2",
    "tableC.column3= tableD.column4", ...],
...]}
},
{"condition": {
    { "tableA.column5": "v1"}, //default to
    tableA.column5= v1
    { "tableB.column1": {
        "value": "v2",        //default to
        SUM(tableB.column1)=v2
        "FUNC": "SUM"
    }
},
...}
},
{"groupby": [
    "tableA.column6",
    { "tableB.column2": {
        "FUNC": "DATE"
    }
},
...]
},
{"having": {
    { "tableB.column3": {
        "value": "v3",
        "FUNC": "MAX"
    }
},
...}
},
{"orderby": [
    "tableA.column7",
...]
}
}},
{"output":
    {"results":
        [{ "tableA.column8": ""},
        { "total1": ""},
...]}
}}
```

The input.requirement is corresponding to section A of the SQL select and specify the output of the SQL select. It specifies an array format. The {"tableA.column8": "tableA.column8"} means to get tableA.column8's value and set to the name "tableA.column8".

The pair

```
{ "total1": { "tableB.column4":
    {
        "FUNC": "SUM"
    }
}
``` means apply SUM function column tableB.column4 and apply the value to the name "total1".

Figure 10:
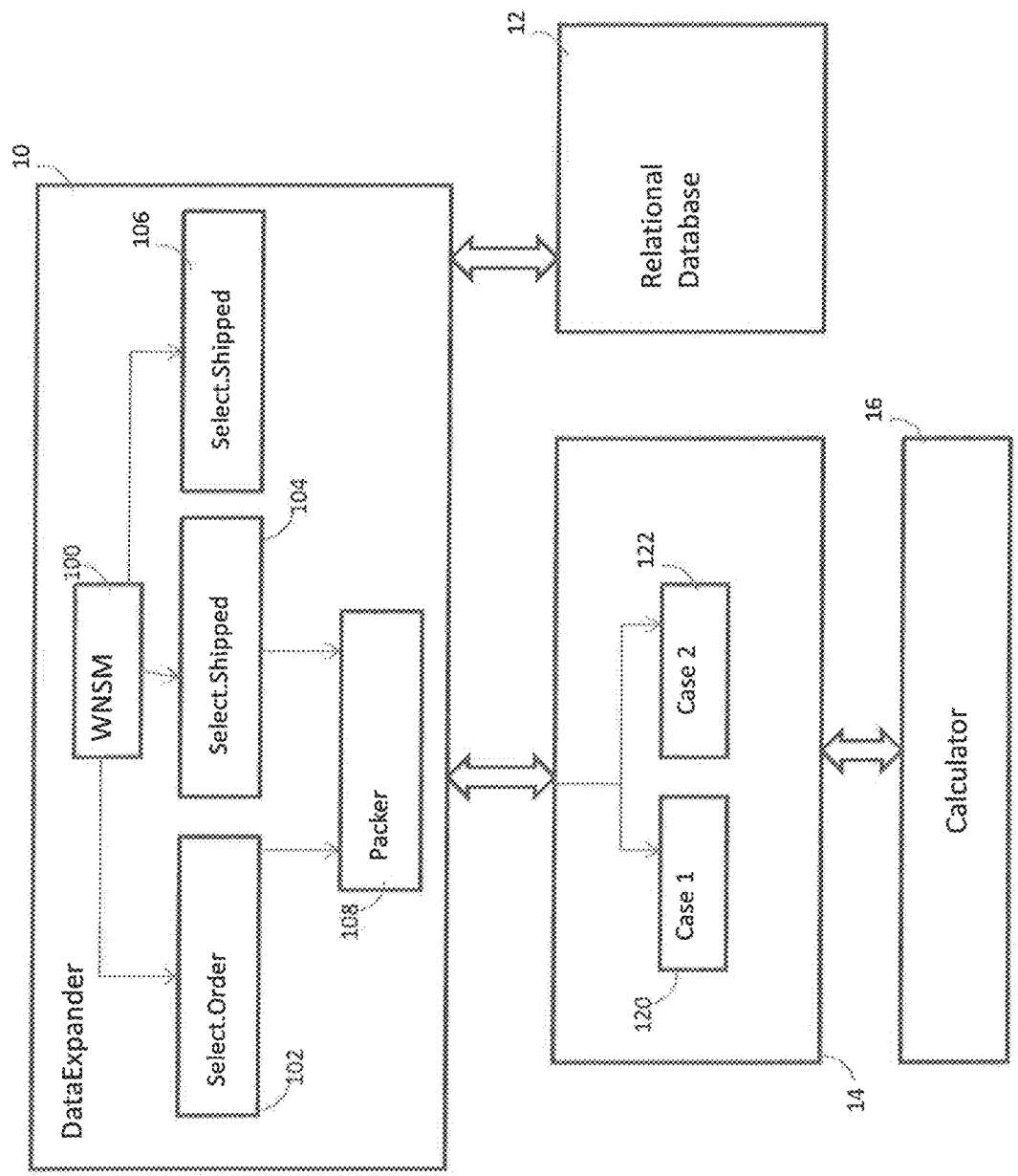
FIG. 10 illustrates an exemplary sequence of part functions being executed in response to an applied data message, according to an exemplary embodiment of the inventive concept.

For the implementation of using more than one PFs to achieve a backend computation task consider the case of operation of shipping of sales orders, as shown in FIG. 10. Assume a sales order can be partially shipped (because of partial payment or constrain of inventory), so a sales order may need to be shipped more than one time. The incoming CGDM is as follows:

```
{ "Order_Shipment_Data" :
    {"input": {
        { "orderID", "value1"}
    }},
    {"output": {
        {"order_info": {
            {"orderCode":""},
            {"salesmanName":""},
            {"customerName":""}
        }},
        {"order_prod_info": {
            [[{"productName":""}, {"productionDate":""},
            {"Quantity":""},{"shippedQuantity":""},
            { "quantityLeft":""}]]
        }}
    }}
}
```

The input is the order id, the required output includes some order info, a order code, salesman name and customer name, and a list of product information, product name, product date, order quantity, shipped quantity and quantity left to be shipped.

In FIG. 10, the CGDM is received by the DataExpander PF 10. The DataExpander PF 10 connects to a relational dataset 12. A working name space mapping WNSM 100 for the CGDM is as follows:

```
{
    {"orderID", "order.id"};
    { "orderCode", "order.code"}
    { "salesmanName", "employee.name" }
    {"customerName", "customer.name"}
    {"productName", "product.name"}
    {"productionDate", "product.productionDate"}
    { "Quantity", "order.Quantity" }
}
```

After mapping the CGDM becomes as follows:

```
{ "Order_Shipment_Data" :
    {"input":
        { "order.id", "value1"}
    },
    {"output": {
        {"order_info": {
            {" order.code": ""}
            {" employee.name": ""},
            {" customer.name": ""}
        }},
        {"order_prod_info": {
            [[{"product.name": ""}, {" product.productionDate": ""},
            {" order.Quantity": ""},{"shippedQuantity": ""},
            { "quantityLeft": ""}]]
        }}
    }}
}
```

The PF 10 has two CFs, Select and Packer. The Select CF runs three instances, 102, 104, and 106. The Packer CF runs one instance 108. The Select does the type SQL select of the above example to a relational database, the Packer CF packs all its inputs into a corresponding input and output parts of a data message (e.g., a CGDM) and sends the data message to a Loop PF 14. The PF 14 has one CF called KeyMatch-Loop which runs one instance that takes arrays A and B, as inputs, and outputs an array C. Each element in A, B and C has a key part and a value part. The key of an element is a sequence of name-values. Two keys are the same type if the length of the name value sequence of the two keys are the same and for the two name-value pairs of each position of the sequence the names are the same. Two keys are equal if they have the same type and the values of the corresponding names are equal. A and B have the same type of key. The algorithm of KeyMatchLoop is, For each element a of A
    Create an element c with key part same as a
    if there is an element b of B with a.key==b.key

```
{
    value part of c is computed from value parts of a
    and b by computation rule 1.
}
else {
    value part of c is computed from value parts of a
    and b by computation rule2.
}
add c to
```

The computation rule1 and computation rule2 are done by the Calculator PF 16. The PF 16 has 3 computations, the Equal, Zero and Minus. The CGDM of Order_Shipment_Data for PF 10 is,

```
{"Order_Shipment":
    {"Select.order":
        {
        { "input": {
            { "requirement": {
                {"order.code": "order.code"}
                {"salesman.name": "salesman.name"},
                {"customer.name": "customer.name"}
            }},
            { "condition" : {
                {"order.id", "Order_Shipment_Data.input. 'order.id'" }
            }},
            { "table" : {
                {["order", "salesman", "inner join", "order. salesmanID=salesman.id"],
                ["order", "customer", "inner join", "order. customerID=customer.id"]}
            }}
        }},
        { "output":
            { "result": "Order_Shipment_Data.output.order_info"}
        }}
    }},
    {"Select.orderProduct":
        {
        { "input": {
            { "requirement": {
                [{"product.name": "product.name"},
                {"production.date": "production.date"},
                {"order_product.quantity": "order_product.quantity"}]
            }},
            { "condition" : {
                { "order_product.orderId",
                    "Order_Shipment_Data.input.'order.id'" }
            }},
            { "table" : {
                ["order_product", "product", "inner join",
                    "order_product.productId=production.id"]
            }}
        }},
        { "output": {
            "result": ""}
        }}
    }}
    {"Select.shipped":
        {
        { "input": {
            { "requirement": {
                {"product.name": "product.name"},
                {"production.date": "production.date"},
                { "shippedQuantity": { "shipment.Quantity":
                    {
                        "FUNC": "SUM"
                    }}
                }
            }},
            { "condition" : {
                {"shipment.orderid","Order_Shipment_Data.input.'order.id'" }
            }},
            { "table" : {
                ["shipment", "product", "inner join", "shipment.productID= product.id"]
```

```
            }}
            { "aggregate" : {
                    ["product.name", "product.productiondate"]
            }}
        }},
        { "output":
                { "result": ""}
        }
    }}
}}
{"packer": {
    {"input": {
        {"In":
        {
            {"A": "Select.orderProduct.output.Result"},
            {"B": "Select.shipped.output.Result"}
        }},
        {"Out": {{"C": "Order_Shipment_Data.output.order_prod_info"}}}
    }},
    {"output": {
        {"result" : "Order_Shipment_Data.output.order_prod_info"}
    }}
}}
}
```

The order_prod_info of output part of the data message Order_Shipment_Data is used as input to generate the output part of the data message the PF 10 sends to the PF 14. The PF 10 sends a data message Order_Shipment_Data_Full to PF 14,

```
{"Order_Shipment_Data_Full": {
  {"input": {
    {"A": [[{"product.name": "v1"}, {"product.productionDate": "v2"},
        {"order_product.quantity": "v3"}]]},
    {"B": [[{"product.Name": "v4"}, { "product.productionDate": "v5"},
        {"shippedQuantity": "v6"}]]}
  }},
  {"output": {
    {"C": [[{"product.Name": ""}, { "product.productionDate": ""},
        {"order.Quantity": ""},{"shippedQuantity": ""},{ "quantityLeft":
        ""}]]}
  }}
  }
}
```

The CGDM of the data message Order_Shipment_Data-_Full for the PF 14 is.

```
{"Loop": {
    {"input": {
      {"A":
        {"Order_Shipment_Data_full.Input.A",
            {"key":["product.name", "product.productionDate"]},
            {"value":{ { "shippedQuantity" } }]
        },
        {"B" :
            {"Order_Shipment_Data_full.Input.B",
            {"key":["product.name", "product.productionDate"]},
            {"value":{ {"order_product.quantity"} }]
        },
        { "C" :
            ["Order_Shipment_Data_full.output.C",
            {"key":["product.name", "product.productionDate"]},
        {"value":{{"order_product.quantity"},{"shippedQuantity"},
        {"quantityLeft"}}]
        }
```

```
    }},
    {"output":
        { "result": "Order_Shipment_Data_full.output.C"}
    }
  }
}
```

The PF 14 send two data messages to the PF 16,

```
{"Order_data": {
    {"input": {
        {"A":{ "order_product.quantity": "v1"}}
    }},
    {"output": {
        {"C":{{"order_product.Quantity": ""},{"shippedQuantity": ""},
    { "quantityLeft":""}}}
    }}
}
{"Order_Ship_data": {
    {"input": {
        {"A": { "order_product.quantity": "v1"}},
        {"B": {"shippedQuantity": "v2"}}
    }
    {"output": {
        {"C": {{"order_product.quantity": ""},{"shippedQuantity": ""},
    { "quantityLeft":""}}}
    }}
}
```

The CGDM for Order_Ship_data is.

```
{"Order_Ship_Data": {
    {"Equal.quantity": {
        {"input": {
            "X": "A.order_product.quantity"
        }},
        {"output":  {
            "Y": "C.order_product.quantity"    //Y=X
        }}
    },
    {"Equal. quantityLeft": {
        {"input": {
            "X": "A.order_product.quantity"
```

-continued

```
  }},
  {"output": {
    "Y": "C.quantityLeft"
  }}
  }
  }
  {"Zero": {
    {"output": {
      "X": "C.shippedQuantity"   //X=0
    }}
  }
  }
}}
```

The CGDM for Order_data is as follows:

```
{"Order_Data": {
  {"Equal.quantity": {
    {"input": {
      "X": "A.order_product.quantity"
    }},
    {"output": {
      "Y": "C.order_product.quantity"
    }}
    }
  },
  {"Equal.shippedQuantity": {
    {"input": {
      "X": "B.shippedQuantity"
    }},
    {"output": {
      "Y": "C.shippedQuantity"
    }}
    }
  },
  {"Minus": {
    {"input": {
      {"X": "A.order_product.quantity"},
      {"Y": "B.shippedQuantity"}
    }},
    {"output": {
      "Z": "C.quantityLeft"  //Z=X-Y
    }}
    }
  }
}}
```

The output part of the data message Order_Shipment_Data are formed by the output part of the CF instance 106 and the CF instance 108. It can then be reversely mapped to the working name space of the incoming data message Order_Shipment_Data and send to the sender of the Order_Shipment_Data.

An exemplary embodiment of the invention makes use of markups and a property sheet of a CGDM. While this embodiment will be discussed below with respect to a linear cascade, the invention is not limited to any particular organization of data. A linear cascade is a list of <select> elements that, starting from the first element and except the last element, the selected value of one <select> element determines the options of the next <select> in the list, One example of the linear cascade inputs is the Country-State-City inputs, which enables a user to select a country from the Country's options, determines the options of the State, enables a user to select a state from the State's options, and determines the options of the City. In a browser implementation Country, State and City each represented by a <select> element. An event handler for Country is attached to the Country <select> element, an event handler for State is attached to the State <select> element. For example, when a country such as "USA" is selected, the event handler of Country is called, and the event handler gets the value of "USA" and creates a message of {Country="USA", State[ ]} and sends the message to a backend process to get all states for "USA" and store the values in the State[ ]. The values of State[ ] is then set to the <select> representing State. The event handler for State and City are similar.

In an embodiment of the invention, the cascade is represented by as a list data structure, where each element of the list has five members, namely ID, Next, SelectedValue, eventHandler and Options. The ID holds the name of the element, the Next has the value of the Name of the next element of the list, the SelectedValue holds the selected values, the eventHandler holds the event handler function of the element and the Options holds a set of values. An action of selecting a value from the Options and setting the SelectedValue can be done to the element of the list. When the action is done, the function in the eventHandler is called by passing the element as the argument.

The algorithm is abstract because the IDs can take any names. They can be Country, State, City or Company, Department, Employee Name or Category, Type, Product Name. The algorithm is generalized because any number of elements is allowed.

Next, the list structure is marked on the HTML. Except ID and Next, the <select> element has all others. In our definition of CGDM, each value should have a name, so on a CGDM, only the Next is needed. We assume the name of value is implemented by adding an ID property to all elements of the HTML tag.

The Markup Rule for the cascade is for each <select> element add a Next property and its value is the ID' value of the next <select> in the cascade. More than one cascade in one HTML page is allowed.

In general, the Markup Rule is defined as the Rules to expand the content of a CGDM using the CGDM's syntax rules such that for any input instance of the algorithm there is an expanded content corresponding to it and the input instance and its full data features can be deducted from the expanded content. A Markup Rule is associated with an algorithm.

The PF function maybe the event-handler of the selection event for all the <select> elements, even in a different cascade. In this example, we give the PF the name cascadePF. The inputs of the cascadePF are the selected value and the <select> element that generate the event. A Document Object Model (DOM) structure of the whole HTML is also accessible to the cascadePF. The CGDM of the PF can be considered as CGDM={{the selected <select> element}, DOM} with the input part being {{the selected <select> element}, {All <select> element of the cascade}} and the output part being {{the next element of the selected <select> element}}.

Because all cascades, even in different HTML pages, use the same cascadePF and also can use the same CGDM name, the VMSS Store of the cascadePF can be configured to return one VMSS for any lookup. Exemplary CF functions of the cascadePF are, initRestElement(CurrentElementName name), which for a current element with ID=name, resets the options for all from the next element to the end, Results r=getValuesFromBackend(Condition condition, Results r, BackendProc p, CGDMName pCGDMName), which packs a CGDM and calls a backend process p and passes a CGDM with name pCGDMName, and setOptions (Results r); set options of the <select> of ID=r.name. The CGDM has the format,

```
{pCGDMName: {
    {Input: {Condition:{ name:value}}}, {Output:{Results:{ r:NULL}}
}
```

Because the cascadePF can be used for all the <select> elements, the selected <select> element the PF receives is different when the selection is done on different <select> elements. So a direct Variable Mapping (VM) is not possible. But the arguments of the CFs can be deducted from the Markups and the CGDM. We call this the Rule Based VM (RBVM).

In the backend we can have a PF called handleDBSelection, which contains set SQL select implementations. Usually the values of options for a <select> can be obtained by running a SQL select. We assign cascadeOptionsCGDM as the name of the CGDM and the getValuesFromBackend are passed to the handleDBSelection.

Using RBVM, the VMSS for the PF becomes,

```
{initRestElement: RBVM}
{ getValuesFromBackend: {{ condition: RBVM }, {r : RBVM }, { p:
handleDBSelection },{ pCGDMName: cascadeOptionsCGDM }}}
{ setOptions: { {r: getValuesFromBackend.r}}
```

The Callers of the CFs are, initRestElementCaller (RBVM, CGDM, CFResults)

```
{
    name = get the ID's value of the selected <select> element
    initRestElement(name);
}
getValuesFromBackendCaller(RBVM, CGDM, CFResults)
{
    (name, value) = get the ID's value and the selected value of
    the selected <select> element
    name = get the ID's value of the next element of the selected
    <select> element
    r = getValuesFromBackend(value, name, handleDBSelection,
    cascadeOptionsCGDM);
    add t to CFResults.
}
setOptionsCaller(RBVM, CGDM, CFResults)
{
    r = get getValuesFromBackend.r from CFResults
    setOptions(r);
}
```

The benefit of RBVM is the rule processing part of code does not change when a new cascade is added or the length of a cascade is extended. All cascades can use the same cod since the algorithm we have chosen is abstract and generalized.

The implementation of the CFCallers is affected by the Markup Rule. A new CFCaller of a CF needs to be developed for a Markup Rule. Because of Markup Rule, a CF may have more than one CFCaller.

All the CFs are pure algorithm functions and they implement a pure cascade and are not related the application meaning assigned to the cascade. For example, either it's Country-State-County or Grade-Class-StudentName.

The Markups can be done on a separate message that has equal or more expressive syntax rules, using the names of the values of the CGDM as a cross reference. We call the separate Markup message, the Property Sheet (PS) of the CGDM. Any CGDM can have a PS attached to it. Because at development time, the Name Instance (NI) of the CGDM is known, so a PS can be attached to a CGDM at development time.

Having described exemplary embodiments of the invention, it is to be understood that the invention is not limited to the disclosed embodiments, and is intended to cover various modifications and equivalent arrangements included within the spirit and scope of the disclosure.

What is claimed is:

1. A method of assembling a computer program by using re-usable software-components to perform a service, the method comprising:
   generating a computational goal data message (CGDM) comprising a first input key-value pair and an output key-value pair based on input and output requirements of the service;
   configuring a part function (PF) of the computer program to receive the CGDM as an input argument;
   generating a variable matching structure sequence (VMSS) including a label to identify a computation function (CF) and a first variable matching structure (VMS) associated with the label, the first VMS including a first input key-pair mapped to an input parameter of the CF and to the first input key-value pair of the CGDM and an output key-pair mapped to an output parameter of the CF and to the output key-value pair of the CGDM; and
   associating the CGDM with the VMSS to enable the PF to invoke the CF according to the first VMS,
   wherein the CF is configured to perform an operation related to the service, and
   wherein the first input key-pair of the first VMS includes a first input key that is mapped to the input parameter of the CF and a second input key that is mapped to the first input key-value pair of the CGDM.

2. The method of claim 1,
   wherein the CGDM further comprises a second input key-value pair,
   wherein the VMSS further includes a second variable matching structure (VMS) associated with the label, the second VMS including a second input key-pair mapped to an input parameter of the CF and to the second input key-value pair of the CGDM and an output key-pair mapped to an output parameter of the CF and to the output key-value pair of the CGDM, and
   wherein the second input key-pair of the second VMS includes a first input key that is mapped to the input parameter of the CF and a second input key that is mapped to the second input key-value pair of the CGDM to enable the PF to invoke the CF according to the second VMS.

3. The method of claim 2,
   wherein operating the PF on the CGDM causes the PF to load the VMSS associated with the CGDM, parse the loaded VMSS to retrieve the label associated with the CF, and the first VMS and the second VMS associated with the retrieved label, execute the CF on a value of the first input key-value pair mapped in the retrieved first VMS to the first input key-pair and then execute the CF on a value of the second input key-value pair mapped in the second VMS to the second input key-pair.

4. The method claim 1, further comprising storing the VMSS in data storage indexable by a name of the CGDM.

5. The method of claim 1, wherein the CGDM has a JavaScript Object Notation (JSON) format.

6. A method of executing a computer program configured to perform a service, the computer program comprising a part function (PF) configured to receive a computational goal data message (CGDM) as an input argument, the CGDM comprising a first input key-value pair and an output key-value pair, the method comprising:

retrieving a variable matching structure sequence (MSS) comprising a label and a first variable matching structure (VMS), using a name of the CGDM;

using the label to retrieve a computation function (CF), the first VMS including a first input key-pair mapped to an input argument of the CF and to the first input key-value pair of the CGDM, and an output key-pair mapped to an output parameter of the CF and to the output key-value pair of the CGDM; and operating the retrieved CF using the first VMS, wherein the first input key-pair of the first VMS includes a first input key that is mapped to the input argument of the CF and a second input key that is mapped to the first input key-value pair of the CGDM.

7. The method of claim 6, wherein the CGDM further comprises a second input key-value pair, wherein the VMSS further includes a second variable matching structure (VMS) associated with the label, the second VMS including a second input key-pair mapped to an input parameter of the CF and to the second input key-value pair of the CGDM and an output key-pair mapped to an output parameter of the CF and to the output key-value pair of the CGDM, wherein the second input key-pair of the second VMS includes a first input key that is mapped to the input parameter of the CF and a second input key that is mapped to the second input key-value pair of the CGDM to enable the PF to invoke the CF according to the second VMS, and the method further comprises operating the retrieved CF using the second VMS.

8. The method of claim 6, wherein the operating of the retrieved CF further uses data stored in an internal data structure of the PF comprising a result of a prior call of the retrieved CF.

9. The method of claim 7, wherein the operating of the retrieved CF using the second VMS comprises the PF invoking a caller that accepts the CGDM, the second VMS, and an internal data structure as input arguments, the internal data structure storing results of operating the retrieved CF using the first VMS.

10. The method of claim 6, wherein the operating of the retrieved CF comprises the retrieved CF generating a second CGDM, and the retrieved CF invoking a second PF with the second CGDM as an input argument.

11. A computer program product to assemble a computer program by using re-usable software-components to perform a service, the computer program product comprising a non-transitory computer readable storage medium having program instructions embodied therewith, the program instructions executable by a computer to perform a method comprising:

generating a computational goal data message (CGDM) comprising a first input key-value pair and an output key-value pair;

configuring a part function (PF) of the computer program to receive the CGDM as an input argument;

generating a variable matching structure sequence (VMSS) including a label to identify a computation function (CF) and a first variable matching structure (VMS) associated with the label, the first VMS including a first input key-pair mapped to an input parameter of the CF and to the first input key-value pair of the CGDM, and an output key-pair mapped to an output parameter of the CF and to the output key-value pair of the CGDM; and associating the CGDM with the VMSS to enable the PF to invoke the CF according to the first VMS, wherein the CF is configured to perform an operation related to the service, wherein the first input key-pair of the first VMS includes a first input key that is mapped to the input argument of the CF and a second input key that is mapped to the first input key-value pair of the CGDM.

12. The computer program product of claim 11, wherein the CGDM further comprises a second input key-value pair, wherein the VMSS further includes a second variable matching structure (VMS) associated with the label, the second VMS including a second input key-pair mapped to an input parameter of the CF and to the second input key-value pair of the CGDM and an output key-pair mapped to an output parameter of the CF and to the output key-value pair of the CGDM, and wherein the second input key-air of the second VMS includes a first input key that is mapped to the input parameter of the CF and a second input key that is mapped to the second input key-value pair of the CGDM to enable the PF to invoke the CF according to the second VMS.

13. The computer program product of claim 12, wherein operating the PF on the CGDM causes the PF to load the VMSS associated with the CGDM, parse the loaded VMSS to retrieve the label associated with the CF, and the first VMS and the second VMS associated with the retrieved label, execute the CF on a value of the first input key-value pair mapped in the retrieved first VMS to the first input key-pair, and then execute the CF on a value of the second input key-value pair mapped in the second VMS to the second input key-pair.

14. The computer program product of claim 11, further comprising storing the VMSS in data storage indexable by a name of the CGDM.

15. The computer program product of claim 11, wherein the CGDM has a JavaScript Object Notation (JSON) format.

16. A method of executing a computer program configured to perform a service, the computer program comprising a part function (PF) configured to receive a computational goal data message (CGDM) as an input argument, the CGDM comprising at least one input/output key-value pair, the method comprising:

a) retrieving a variable matching structure sequence (VMSS) using a name of the CGDM;

b) parsing the VMSS;

c) determining whether a result of the parsing indicates a label is present, an I/O key-pair is present, or an end of the VMSS has been encountered;

d) if the result of the parsing indicates the label is present, retrieving a computation function (CF) associated with the label;

e) if the result of the parsing indicates at least one I/O key-pair is present, for each indicated I/O key-pair, matching a first key of the corresponding I/O key-pair to an I/O parameter of the retrieved CF and matching a second key of the corresponding I/O key-pair to an I/O key-value pair of the CGDM, and formatting a call to the retrieved CF based on the matchings;

f) if the result does not indicate the end of the VMSS, resume to step b); and g) executing the formatted call(s).

17. The method of claim 16, wherein the executing of a call among the formatted calls uses data stored in an internal data structure of the PF comprising a result of previously executing the corresponding CF.

18. The method of claim 17, wherein the executing of the call invokes a caller that accepts the CGDM, a variable matching structure (VMS) in the VMSS associated with the corresponding CF, and the internal data structure, where the VMS includes at least one I/O key-pair.

* * * * *